United States Patent [19]

Motomura

[11] Patent Number: 5,742,822
[45] Date of Patent: Apr. 21, 1998

[54] MULTITHREADED PROCESSOR WHICH DYNAMICALLY DISCRIMINATES A PARALLEL EXECUTION AND A SEQUENTIAL EXECUTION OF THREADS

[75] Inventor: Masato Motomura, Tokyo, Japan

[73] Assignee: NEC Corporation, Tokyo, Japan

[21] Appl. No.: 575,145

[22] Filed: Dec. 19, 1995

[30] Foreign Application Priority Data

Dec. 19, 1994 [JP] Japan .................................. 6-315241

[51] Int. Cl.⁶ ........................................................ G06F 9/40
[52] U.S. Cl. ............................ 395/672; 395/569; 395/678
[58] Field of Search .................................. 395/569, 650, 395/800, 672, 678

[56] References Cited

U.S. PATENT DOCUMENTS

| | | | |
|---|---|---|---|
| 5,050,067 | 9/1991 | McLagan et al. | 395/678 |
| 5,165,038 | 11/1992 | Beard et al. | 395/800 |
| 5,339,415 | 8/1994 | Strout, II et al. | 395/672 |
| 5,353,418 | 10/1994 | Nikhil et al. | 395/678 |
| 5,404,469 | 4/1995 | Chung et al. | 395/391 |

FOREIGN PATENT DOCUMENTS 0 697 653  2/1996  European Pat. Off. .

OTHER PUBLICATIONS

19th Annual Intl. Symposium on Computer Architecture, Gold Coast, Queensland, Australia, 19-21 May, 1992, vol. 20, No. 2, ISSN 0163-5964, *Computer Architecture News*, May 1992, pp. 156-167, R.S. Nikhil, et al., "A Multi-threaded Massively Parallel Architecture".

Primary Examiner—Kenneth S. Kim
Attorney, Agent, or Firm—Foley & Lardner

[57] ABSTRACT

A multithreaded processor includes an instruction pipelined unit 140 and a register file 120 composed of a plurality of register banks 130. The register file 120 is coupled to an external memory 190 through register frame load/store lines 121, so that a register frame, which is defined as a content stored in one register bank 130, can be loaded and stored in bundle. When a thread parallel start instruction and a thread sequential start instruction are executed, the register frames are saved through the load/store lines 121. When a thread end instruction and a thread return instruction are executed, the register frames are restored through the load/store lines 121.

9 Claims, 8 Drawing Sheets

FIGURE 4

| INSTRUCTION NAME | EMBODIMENT 1 | EMBODIMENT 2 |
|---|---|---|
| THREAD PARALLEL START INSTRUCTION | FORK n $x | FORK n |
| THREAD END INSTRUCTION | STOP $x | STOP |
| THREAD SEQUENTIAL START INSTRUCTION | CALL n $x | CALL n |
| THREAD RETURN INSTRUCTION | RETURN $x | RETURN |

MULTITHREADED PROCESSOR WHICH DYNAMICALLY DISCRIMINATES A PARALLEL EXECUTION AND A SEQUENTIAL EXECUTION OF THREADS

BACKGROUND OF THE INVENTION

1. Field of the Invention

The present invention relates to a processor or microprocessor, and more specifically to a multithreaded processor enabling that when a program composed of a plurality of threads are executed in parallel by a plurality of processors, the multithreaded processor can execute a given processing in units of thread in parallel to a processing of the other processors.

2. Description of Related Art

In parallel processor systems constituted of a plurality of processors, a multithreaded processing has been known as one program parallel processing method for executing one program in parallel so as to realize a high performance. A processor having an internal structure so configured to efficiently execute a given multithreaded processing, is called a "multithreaded processor".

In the multithreaded processing, one program is constituted of a plurality of threads which can be executed in parallel to each other, and these threads are simultaneously processed in parallel by a plurality of multithreaded processors. Generally, the multithreaded processor includes a thread parallel start instruction, a thread end instruction, a thread sequential start instruction, and a thread return instruction.

An operation based on the thread parallel start instruction is to generate a thread descriptor and to output the thread descriptor to other multithreaded processors. On the other hand, execution of a thread being executed by a multithreaded processor as the result of the parallel start, is terminated by the thread end instruction. When the execution of the thread is terminated by the thread end instruction, the multithreaded processor concerned receives a new thread descriptor from another multithreaded processor or the multithreaded processor concerned itself, and starts execution of the new thread in accordance with the received thread descriptor. The starting of the execution of the thread in this manner is called a "parallel start".

Operation based on the thread sequential start instruction, is to temporarily interrupt the thread being executed, and to sequentially execute another thread designated by the thread sequential start instruction concerned. The thread return instruction is an instruction which exists only in the thread started by the thread sequential start instruction. Execution of the thread under execution started by the thread sequential start instruction is terminated by the thread return instruction, and execution of the thread which was executed just before the thread is sequentially started, is restarted. The thread sequential start instruction and the thread return instruction are equivalent to a procedure call instruction and a procedure return instruction existing in an ordinary processor, respectively.

The multithreaded processor as mentioned above and a parallel processor system using the same, are described by R. S. Nikhil, G. M. Papadopoulos and Arvind, "*T: A Multithreaded Massively Parallel Architecture", Proceedings of 19th International Symposium on Computer Architecture, pp 156–167. The disclosure of this paper is incorporated by reference in its entirety into the present application.

In many cases, the above mentioned thread parallel start instruction is called a "fork instruction" or a "start instruction", and the above mentioned thread end instruction is called a "stop instruction" or an "exit instruction".

As one conventional technique of the multithreaded processing, which has a relation to the present invention, there is a technique for dynamically limiting the thread parallel start operation based on the thread parallel start instruction. This is disclosed in for example Japanese Patent Application No. 188147/1994, which corresponds to U.S. patent application Ser. No. 08/513,547 filed Aug. 10, 1995, now abandoned, and European Patent Application No. 95 112618.4 filed Aug. 10, 1995. The disclosure of these applications is incorporated by reference in its entirety into the present application.

Here, to dynamically limit the thread parallel start operation is that, in the parallel multithreaded processor system, when a sufficiently amount of threads exist already, a parallel start operation of a new thread is dynamically stopped, and as substitute, the threads are sequentially started from the thread being executed. With this arrangement, it is possible to dynamically prevent an excessive parallel-processing.

In order that one thread causes another thread to be started by another multithreaded processor in parallel, it is necessary to transfer an argument used by the second thread. Namely, in order to execute the thread, the arguments are necessary, and the arguments are transferred at the time of the starting. A first conventional method for transferring the arguments is to directly put the arguments into the thread descriptor. However, since the number of arguments is not sure, it often becomes very large, and the size of the thread descriptor becomes indefinite. Therefore, it is difficult to restrict an upper limit of the thread descriptor, and accordingly, management of the thread descriptor becomes very troublesome. Thus, this first method is disadvantageous.

A second conventional method for transferring the arguments is to cause a generating side thread to write the arguments into a memory and to notify a pointer guiding a memory location where the arguments is written, to a generated side thread by a thread descriptor. In this method, the thread starting the parallel operation, writes the arguments one by one into the memory from the register file, and thereafter, outputs the thread descriptor by the thread parallel start instruction. In response to a load instruction, the thread started in parallel, reads the arguments one by one from the memory and to write to the register file. As seen from this, however, the second method needs a considerable time for transferring the arguments.

In addition, the conventional technique for dynamically limiting the thread parallel start operation discriminates whether or not it is possible to output the thread descriptor based on the thread parallel start instruction, and selects either to output the thread descriptor or to start to sequentially execute the thread, on the basis of the result of the discrimination. The above mentioned patent application discloses a method for realizing this operation in response to the thread parallel start instruction. However, the above mentioned patent application does not show the method for transferring the arguments.

Whether or not it is possible to output the thread descriptor based on the thread parallel start instruction, cannot be known until the thread parallel start instruction is actually executed. In the second conventional method, however, when it is possible to output the thread descriptor based on the thread parallel start instruction, it is necessary to previously write the arguments into the memory before the thread parallel start instruction. Therefore, it is necessary to previously write the arguments into the memory, even if the sequential start is performed. On the other hand, as the method for efficiently transferring the arguments when the thread is sequentially started, there is a method for executing the thread sequential start instruction by maintaining the argument in the register file, which is generally well known as a register transfer. As mentioned above, in order to execute the sequential start of the thread when the thread parallel start operation was impossible, the arguments are previously written into the memory. Therefore, the start of the sequential operation as the result of the failure of the parallel start operation, needs the overhead which is greatly larger in time than the sequential start of the thread based on the thread sequential start instruction.

Another problem of the conventional method is that a method for constructing an instruction train of the thread is different between the case of starting the thread in parallel and the case of sequentially starting the thread. This reflects a method for terminating the thread. When the thread started in parallel is terminated, the thread end instruction is used, and on the other hand, when the thread started sequentially is terminated, the thread return instruction is used. Furthermore, in the case of dynamically limiting the parallel start, when it is attempted to transfer the arguments by the register transfer in the sequential start in the above mentioned second conventional method, the transfer becomes possible by previously discriminating whether or not it is possible to output the thread descriptor, before the thread is actually started. However, it is necessary to prepare two kinds of instruction trains, namely, the register transfer and the memory transfer, and to execute either of the two kinds of instruction trains on the basis of the condition discrimination. In this case, therefore, an extra instruction is required for the condition discrimination, so that an overhead occurs both in the instruction execution time and the instruction size.

On the other hand, Japanese Patent Application No. 190447/1994, which corresponds to U.S. patent application Ser. No. 08/514,928 filed Aug. 14, 1995, discloses a technology for widening the data transfer band width between a register file and a memory in a microprocessor. The disclosure of this application is incorporated by reference in its entirety into the present application. In this proposed technology, the register file is composed of a plurality of register banks so that the data transfer between the register file and the memory is carried out in units of register bank.

SUMMARY OF THE INVENTION

Accordingly, it is an object of the present invention to provide a multithreaded processor which has overcome the above mentioned defects of the conventional ones.

Another object of the present invention is to provide a multithreaded processor, which has a wide data transfer band width as disclosed in Japanese Patent Application No. 190447/1994 and which has solved the above mentioned problem of the large overhead in the execution time caused when the arguments are transferred at the time of starting the thread in parallel.

Still another object of the present invention is to provide a multithreaded processor, which has reduced the overhead of the execution time when the thread is sequentially started in the case that the thread parallel start operation is dynamically limited, to a level which is the same as the overhead of time in the sequential start based on the thread sequential start instruction.

A further object of the present invention is to provide a multithreaded processor capable of allowing the thread to be constituted of the same train of instructions both in the case of the parallel start and in the case of the sequential start.

The above and other objects of the present invention are achieved in accordance with the present invention by a multithreaded processor including an instruction pipelined unit and a register file which is composed of a plurality of register banks, a content stored in each of the register banks constituting a register frame, the multithreaded processor having a plurality of kinds of instruction including a thread parallel start instruction, a thread end instruction, a thread sequential start instruction and a thread return instruction, the multithreaded processor being capable of sequentially executing a plurality of threads generated from one program, the multithreaded processor comprising:

means for saving any number of register frames from the register file to a memory coupled to the multithreaded processor at the time of executing the thread parallel start instruction and at the time of executing the thread sequential start instruction, and means for restoring any number of register frames from the memory to the register file at the time of executing the thread end instruction and at the time of executing the thread return instruction In one embodiment of the multithreaded processor, link register banks are provided as one kind of register banks and a link pointer is defined as a pointer indicating a memory location when the register frame stored in the link register bank is stored into the memory. The multithreaded processor further includes means for writing, when the multithreaded processor outputs a thread descriptor to another multithreaded processor in order to execute the thread parallel start instruction, the link pointer in the thread descriptor, and for saving any number of register frames stored in any number of the link register banks to a memory location of the memory designated by the link pointer.

Furthermore, the multithreaded processor can include means for restoring, when the thread end instruction is executed and the multithreaded processor receives the thread descriptor to start a new thread in parallel, any number of the register frames from the memory location of the memory designated by the link pointer included in the thread descriptor, to any number of the link register banks.

Alternatively, context register banks are provided as one kind of register banks and a context pointer is defined as a pointer indicating a memory location when a register frame stored in the context register bank is stored into the memory. The multithreaded processor further includes means for saving, when the processing of a thread being executed is interrupted and a new thread is sequentially started in response to the thread sequential start instruction, any number of register frames stored in any number of the context register banks, to a memory location of the memory designated by the context pointer.

In addition, the multithreaded processor further includes a means for restoring, when the thread return instruction is executed and execution of the thread which was executed before the thread was sequentially started, is restarted, any number of register frames stored in a memory location of the memory designated by the context pointer, to any number of the context register banks.

Moreover, the multithreaded processor can further include:

means for discriminating, when the thread parallel start instruction is executed and the multithreaded processor outputs the thread descriptor to the another multithreaded processor, whether or not it is possible to output the thread descriptor;

means for outputting, when the outputting of the thread descriptor is possible, the thread descriptor having a link pointer written therein, the means also saving any number of register frames stored in any number of the link register banks to a memory location of the memory designated by the link pointer, by action of a register frame load/store function; and means for saving, when the outputting of the thread descriptor is not possible, any number of register frames stored in any number of the context register banks, to a memory location of the memory designated by the context pointer.

The multithreaded processor can further include:

a sequential start flag so that when the thread end instruction is executed, at the time of terminating the processing of the thread being executed, the sequential start flag is firstly referred to in order to discriminate whether the thread is started in parallel or sequentially;

means for terminating, when the thread is started in parallel, the processing of the thread being executed, the means also receiving the thread descriptor from another multithreaded processor or the multithreaded processor itself, the means reading out any number of register frames from a memory location of the memory designated by the link pointer written in the thread descriptor, so as to write to any number of the link register banks; and means for terminating, when the thread is started sequentially, the processing of the thread being executed, the means also reading out any number of register frames from a memory location of the memory designated by the context pointer, so as to write to any number of the context register banks.

Preferably, the multithreaded processor further includes register frame load/store means for performing, in a bundle, the saving, the restoring and the reading of the register frame between the register banks and the memory.

The above and other objects, features and advantages of the present invention will be apparent from the following description of preferred embodiments of the invention with reference to the accompanying drawings.

BRIEF DESCRIPTION OF THE DRAWINGS

FIG. 4 is a table illustrating a thread parallel start instruction, a thread end instruction, a thread sequential start instruction and a thread return instruction, in two embodiments of the multithreaded processor in accordance with the present invention;

DESCRIPTION OF THE PREFERRED EMBODIMENTS

Figure 1:
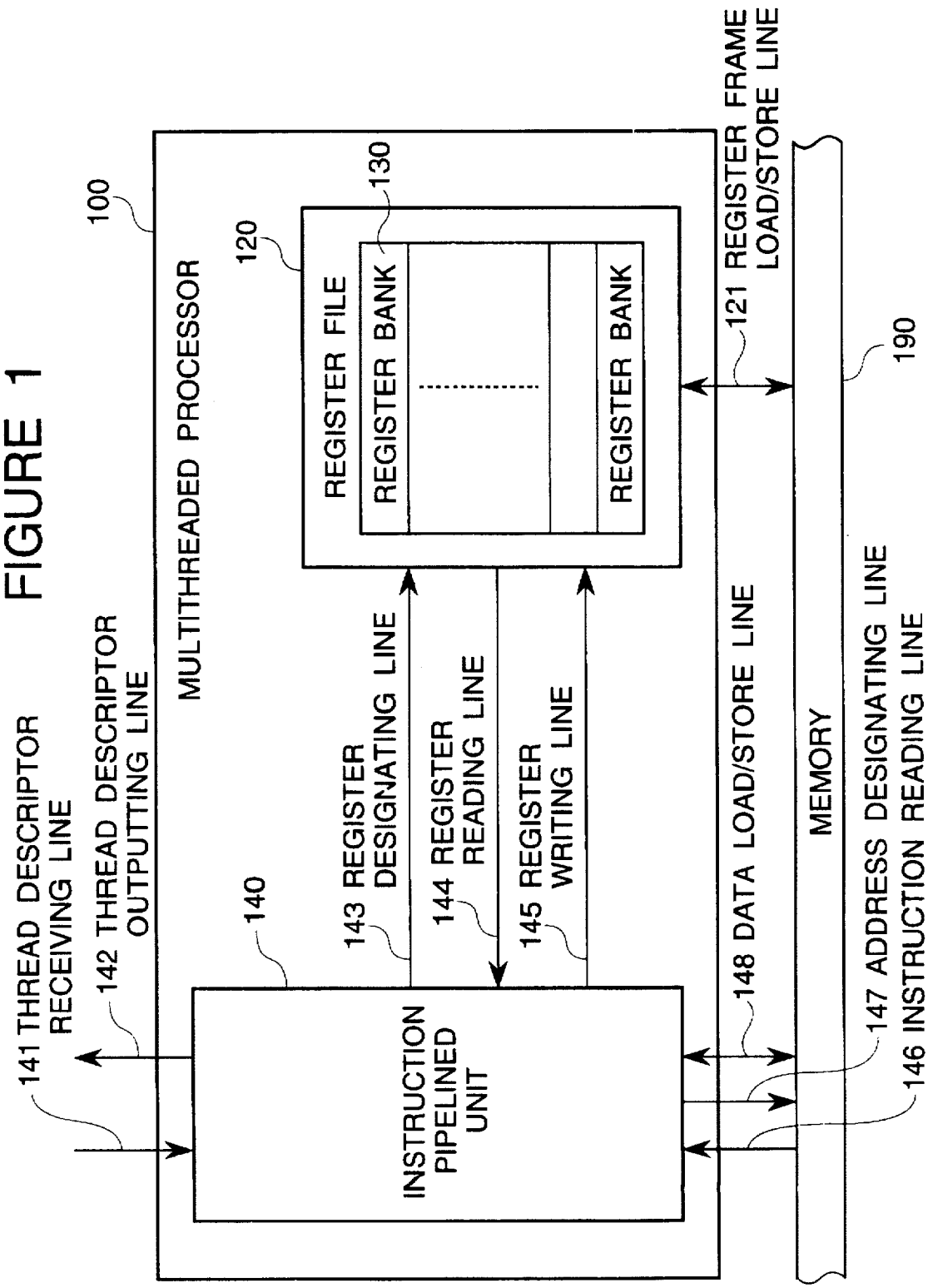
FIG. 1 is a block diagram of one embodiment of the multithreaded processor in accordance with the present invention.

Referring to FIG. 1, one embodiment of the multithreaded processor in accordance with the present invention is generally designated by Reference Numeral 100. The multithreaded processor 100 comprises a register file 120 and an instruction pipelined unit 140. The register file 120 includes a plurality of register banks 130. The instruction pipelined unit 140 is coupled to another multithreaded processor (not shown) through thread descriptor receiving lines 141 and thread descriptor outputting lines 142. The instruction pipelined unit 140 is also coupled to the register file 120 through register designating lines 143, register reading lines 144 and register writing lines 145, and to an external memory 190 through instruction reading lines 146, address designating lines 147 and data load/store lines 148. The register file 120 is coupled to the memory 190 through register frame load/store lines 121. The memory 190 is connected to one or more other not-shown multithreaded processors similar to the shown multithreaded processor 100. Thus, a parallel processor system is constituted of the shown multithreaded processor 100 and the not shown multithreaded processors.

Figure 2:
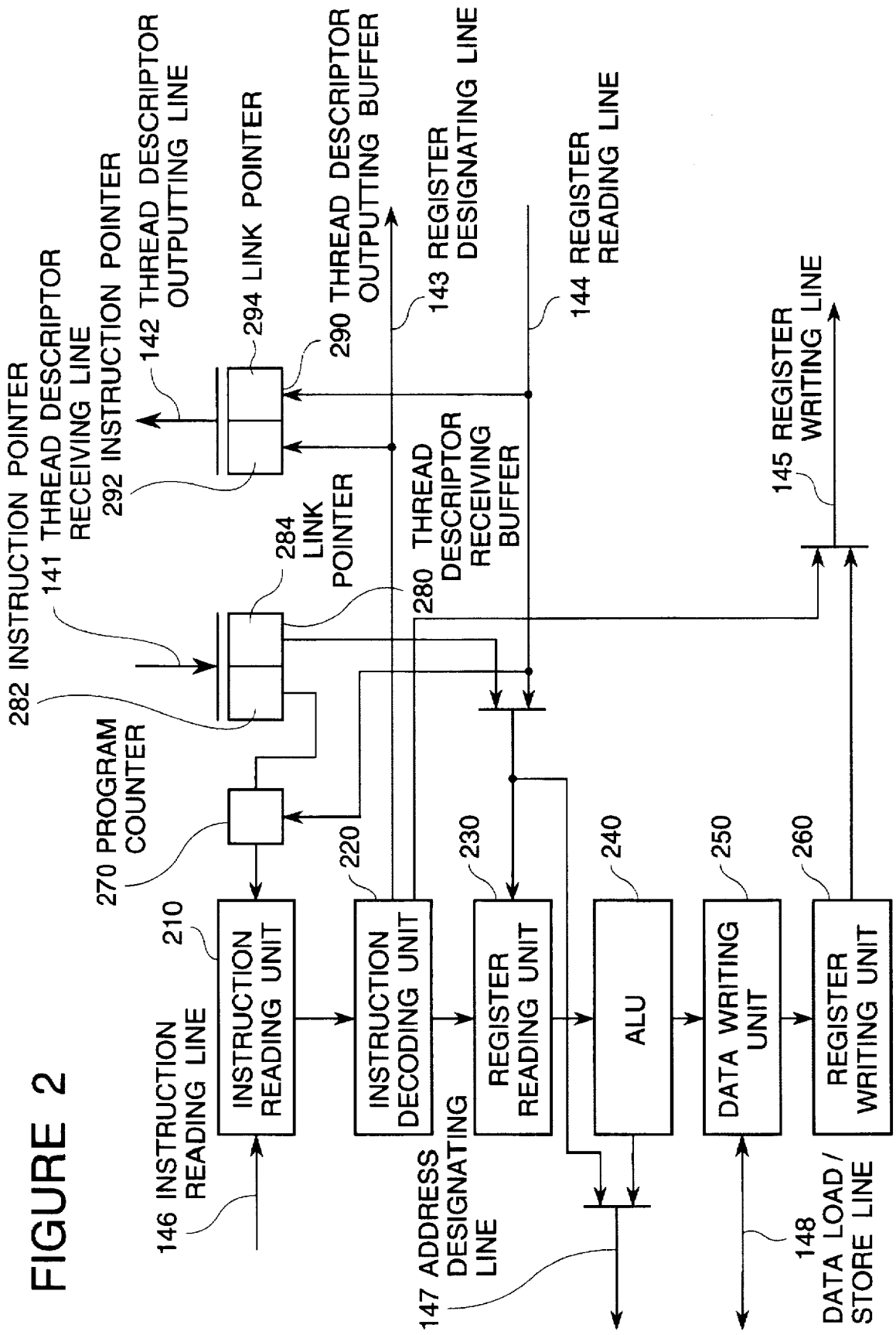
FIG. 2 is a block diagram of the instruction pipelined unit provided in the multithreaded processor shown in FIG. 1.

As shown in FIG. 2, the instruction pipelined unit 140 comprises an instruction reading unit 210, an instruction decoding unit 220, a register reading unit 230, an arithmetic and logic operation unit (ALU) 240, a data writing unit 250 and a register writing unit 260, a program counter 270, as coupled as shown in the drawing, so as to sequentially execute a train of instructions which constitute one thread.

Other than a thread parallel start instruction, a thread end instruction, a thread sequential start instruction and a thread return instruction, ordinary instructions used in the instruction pipelined unit 140 are well known in the art, and therefore, explanation thereof will be omitted in this specification.

The instruction pipelined unit 140 shown in FIG. 2 further includes a thread descriptor receiving buffer 280 and a thread descriptor outputting buffer 290, which are characteristic to the multithreaded processor. In the multithreaded processor 100 in accordance with the present invention, each of thread descriptor receiving buffer 280 and the thread descriptor outputting buffer 290 is constituted of an instruction pointer 282 and 292 and a link pointer 284 and 294, which are a featured structure of the instruction pipelined unit 140.

Figure 3:
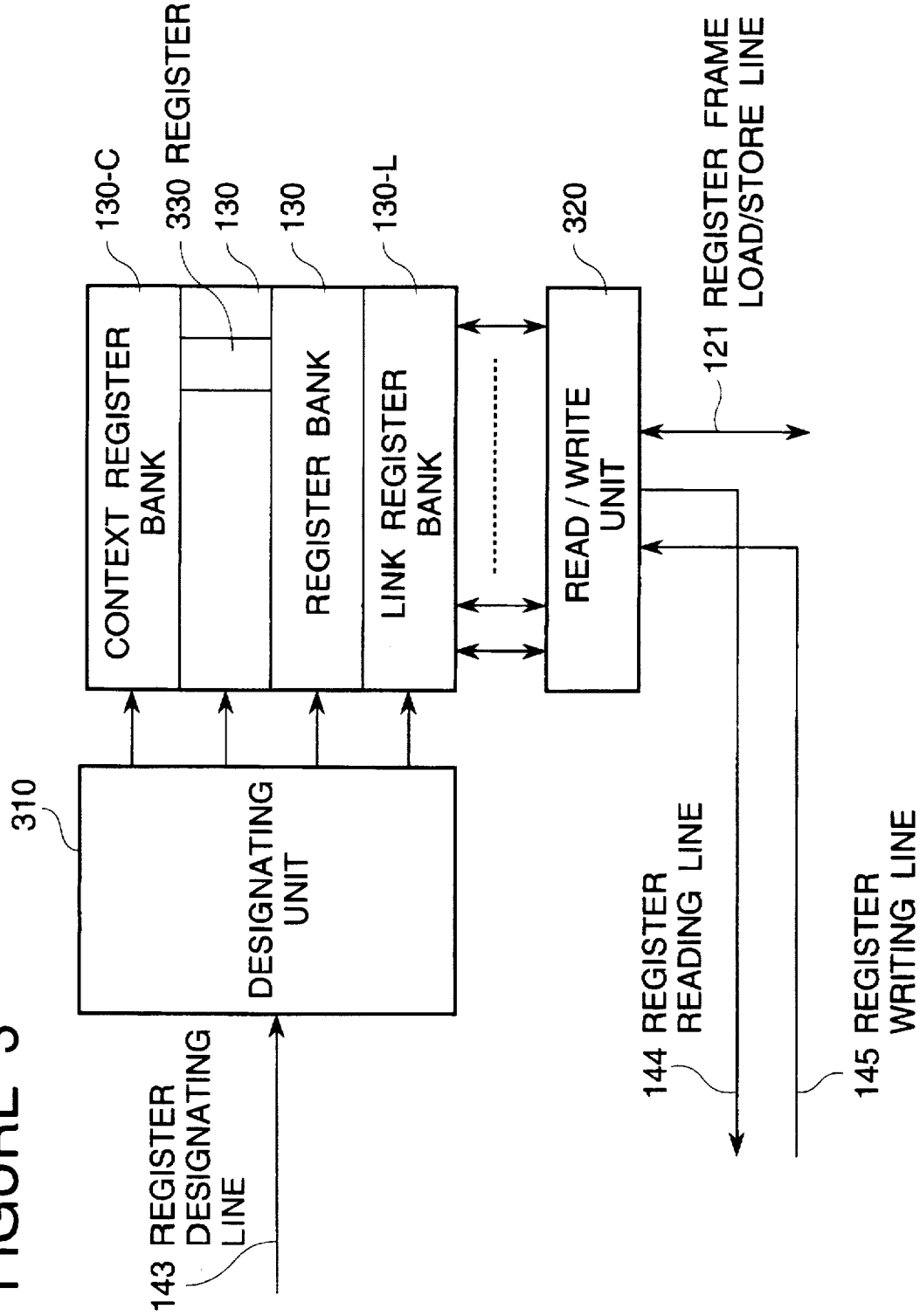
FIG. 3 is a block diagram of the register file provided in the multithreaded processor shown in FIG. 1.

As shown in FIG. 3, the register file 120 is composed of the plurality of register banks 130, a designating unit 310 and a read/write unit 320. Each of the register banks 130 is constituted of a plurality of registers 330, and all the register banks 130 includes the same number of registers 330. In the example shown in FIG. 3, four register banks 130 are provided, but the present invention is in no way limited to the four register banks 130.

In the shown register file 120, the register banks 130 includes at least two kinds of register bank, namely, a link register bank 130-L and a context register bank 130-C. Although one link register bank 130-L and one context register bank 130-C are provided in the example shown in FIG. 3, the number of each of the two kinds of register bank is arbitrary. For example, all of the register banks 130 may be either the link register bank 130-L or the context register bank 130-C. In addition, general-purpose register banks can be set in the register banks 130.

Referring to FIG. 4, there are illustrated a thread parallel start instruction, a thread end instruction, a thread sequential start instruction and a thread return instruction, in two embodiments of the multithreaded processor in accordance with the present invention.

As shown in FIG. 4, as regards the thread parallel start instruction 410, a FORK instruction 412 in Embodiment 1 includes a direct value argument "n" and a register argument "$x", but a FORK instruction 418 in Embodiment 2 includes only a direct value argument "n".

As regards the thread end instruction 420, a STOP instruction 422 in Embodiment 1 includes a register argument "$x", but a FORK instruction 428 in Embodiment 2 includes no argument.

As regards the thread sequential start instruction 430, a CALL instruction 432 in Embodiment 1 includes a direct value argument "n" and a register argument "$x", but a CALL instruction 438 in Embodiment 2 includes only a direct value argument "n".

As regards the thread return instruction 440, a RETURN instruction 442 in Embodiment 1 includes a register argument "$x", but a RETURN instruction 438 in Embodiment 2 includes no argument.

Now, operation of the multithreaded processor in accordance with the present invention will be explained using the instruction formats FORK 412, STOP 422, CALL 432 and RETURN 442 in the Embodiment 1.

Figure 5:
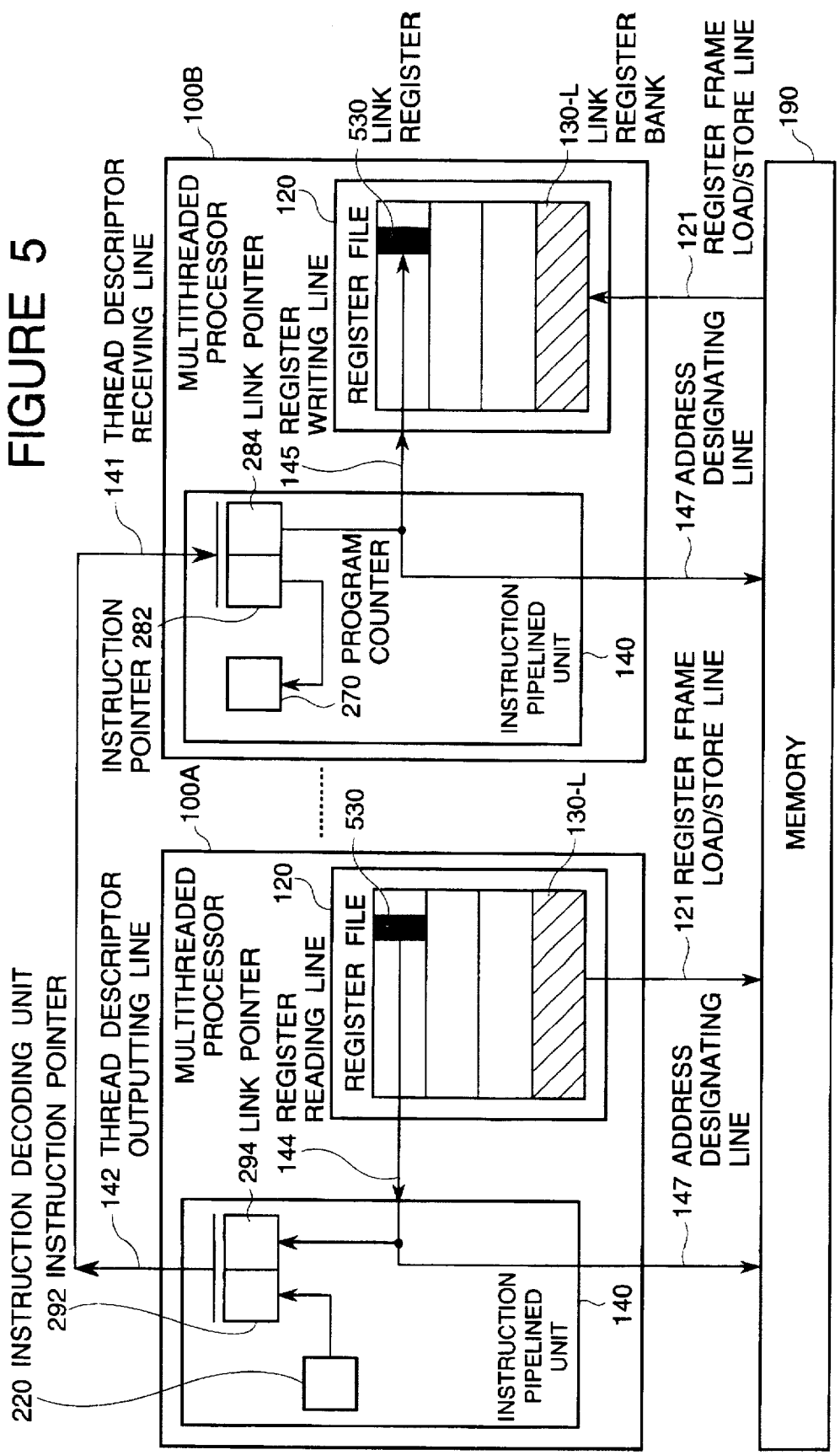
FIG. 5 illustrates an operation of the thread parallel start instruction and the thread end instruction in the multithreaded processor shown in FIG. 1.

Referring to FIG. 5, there is illustrated an operation of the FORK instruction 412 and the STOP instruction 422 in the multithreaded processor shown in FIG. 1. In an example shown in FIG. 5, a left side multithreaded processor 100A schematically operates with the FORK instruction 412 and a right side multithreaded processor 100B schematically operates with the STOP instruction 422. The following description will be made with reference to FIGS. 1 to 5.

The instruction reading unit 210 (FIG. 2) reads the FORK instruction 412, and the instruction decoding unit 220 decodes the FORK instruction 412, so that a thread descriptor is outputted. At this time, values are written into the instruction pointer 292 and the link pointer 294 of the thread descriptor outputting buffer 290. Here, the value written into the instruction pointer 292 indicates a head instruction address of a thread to be forked, which is obtained by adding the value of the program counter 270 and the direct value argument "n" in the FORK instruction 412 by the instruction decoding unit 220. The value written in the link pointer 294 shows a memory location of the memory 190 storing the argument used by the thread started in parallel. This value is obtained by reading through the register reading lines 144 a value stored in a register 330 in the register file 120 designated by the register argument "$x" included in the FORK instruction 412. The register 330 designated in the example shown in FIG. 5, is called a link register 530.

The thread descriptor thus formed is outputted externally through the thread descriptor outputting lines 142.

On the other hand, in the link register bank 130-L, an argument used in the thread started in parallel by the outputted thread descriptor is stored. At the time of outputting the thread descriptor, the value of the link pointer read from the link register 530 is transferred through the address designating lines 147 to the memory 190, and a register frame which is a content stored in the link register bank 130-L, is written into a memory location designated by the value of the link pointer through the register frame load/store lines 121.

When the STOP instruction 422 is read by the instruction reading unit 210 and then is decoded by the instruction decoding unit 220, the thread being executed is stopped, and a new thread descriptor is received through the thread descriptor receiving line 141 so that the parallel start of a new thread is performed in accordance with the new thread descriptor. As mentioned above, the values received in the instruction pointer 282 and the link pointer 284 of the thread descriptor receiving buffer 280 indicates the head instruction address of the thread and the memory location of the memory where the argument to be used by the thread is stored. Thus, the multithreaded processor 100B transfers the received instruction pointer 282 to the program counter 270, so that the execution of the new thread is started in accordance with the program counter 270. In addition, the multithreaded processor 100B transfers the received link pointer 284 to the memory 190 through the address designating lines 147, and reads the register frame from the memory located by the received link pointer 284 so as to write to the link register bank 130-L through the register frame load/store lines 121. In addition, the value of the link pointer 284 is written into the register 330 (designated by 530 in FIG. 5) designated by the register argument "$x" of the STOP instructions 422.

Incidentally, when a plurality of link register banks 130-L are provided, a plurality of register arguments are designated in the FORK instructions 412 and in the STOP instruction 422. Alternatively, the register frames which are the contents stored in the plurality of link register banks 130-L are written into or read from memory locations (for example, continuous memory locations) designated by values which can be simply calculated from the value of the link register 530 designated by one register argument. On the other hand, if all the arguments cannot be stored in the link register bank 130-L because the number of arguments is too large, these arguments are previously written into continuous memory locations.

In the example shown in FIG. 5, the link register 530 is prepared in the context register bank 130-C, but the present invention is in no way limited to this fashion. In addition, since the link register 530 is designated by the register argument "$x", it is possible to select any arbitrary register 330.

Figure 6:
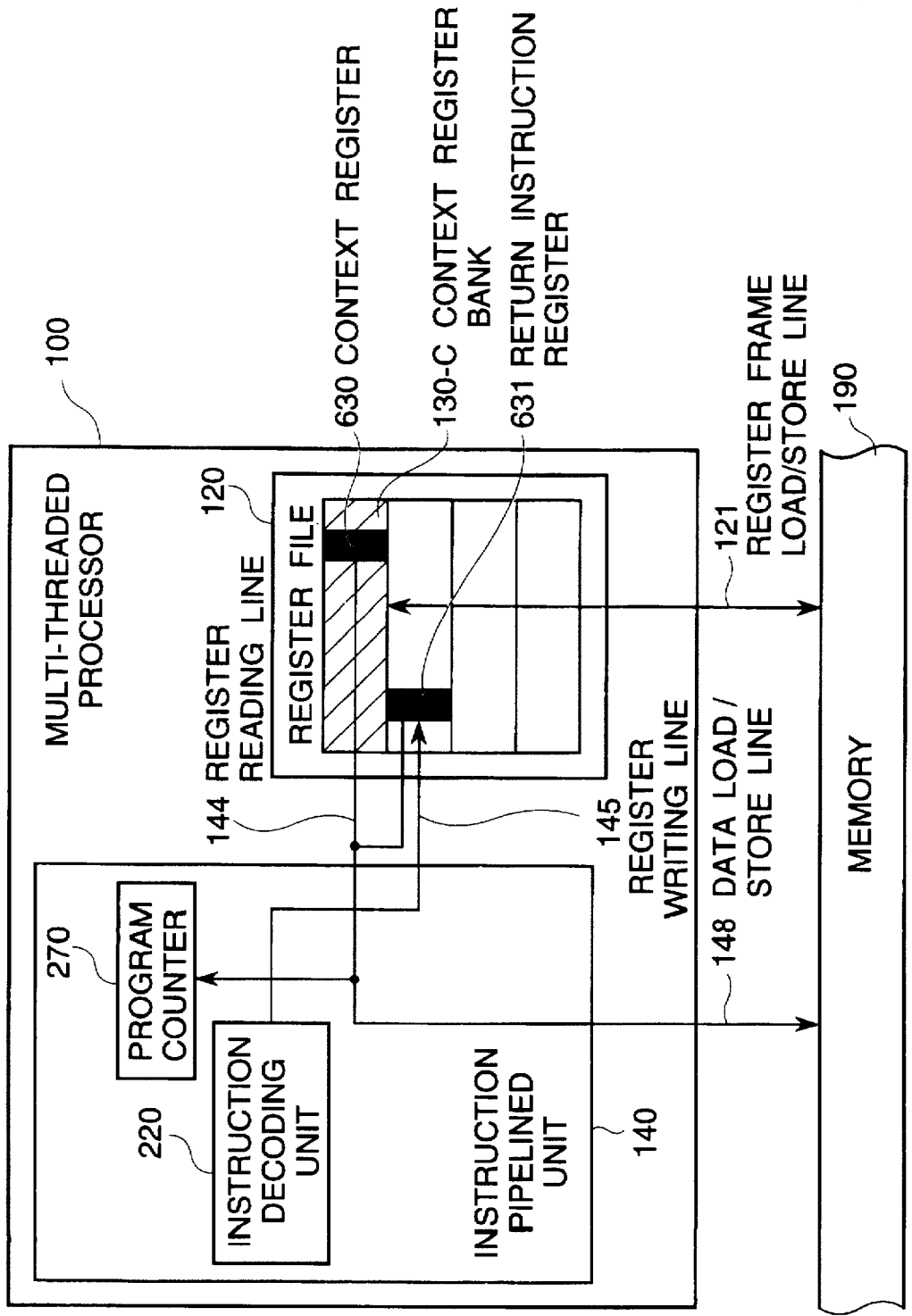
FIG. 6 illustrates an operation of the thread sequential start instruction and the thread return instruction in the multithreaded processor shown in FIG. 1.

Referring to FIG. 6, there is illustrated an operation of the CALL 432 and the RETURN 442 in the multithreaded processor shown in FIG. 1. The following description will be made with reference to FIGS. 1 to 4 and 6.

First, the CALL instruction 432 (FIG. 4) is read by the instruction reading unit 210 (FIG. 2) and then decoded by the instruction decoding unit 220, so that the sequential start of the thread is performed. At this time, a head address of instructions started sequentially, is obtained by adding the value of the program counter 270 and the direct value argument "n" in the CALL instruction 432 by the instruction decoding unit 220. An address of an instruction next to the instruction whose execution is stopped, is written from the instruction decoding unit 220 through the register writing line 145 to the register 130. Here, the register 130 thus written is called a "return instruction register" which is designated by Reference Numeral 631 in FIG. 6.

A register frame which is a content stored in the context register bank 130-C, is read out through the register frame load/store lines 121 to a memory location of the memory 190 designated by the value read from the register 130 designated by the register argument "$x" in the CALL instruction 432. Here, the register 130 thus designated is called a "context register" which is indicated by Reference Numeral 630 In FIG. 6. In addition, in the context register bank 130-C, there is stored the data which are required to restart later the execution of the thread whose execution had been interrupted. This data is generally called "context information".

Next, when the RETURN instruction 442 is read by the instruction reading unit 210 and then decoded by the instruction decoding unit 220, the sequentially started thread being executed is terminated, and it restarts to execute the thread which had been executed before the thread was started sequentially. The address of the instruction to be restarted is obtained by reading the value stored in the return instruction register 631, and then, is written into the program register 270. In addition, the register argument "$x" in the RETURN instruction 442 designates the context register 630, and the register frame is read from the memory 190 by using the value of the context register 630, and is restored in the context register bank 130-C of the register file 120 through the register frame load/store line 121.

Incidentally, when a plurality of context register banks 130-C are provided, a plurality of register arguments are designated in the CALL instructions 432 and in the RETURN instruction 442. Alternatively, the register frames which are the contents stored in the plurality of context register banks 130-C are written into or read from memory locations (for example, continuous memory locations) designated by values which can be simply calculated from the value of the context register 630 designated by one register argument.

In the example shown in FIG. 6, the context register 630 is prepared in the context register bank 130-C, but the present invention is in no way limited to this fashion. In addition, since the context register 630 is designated by the register argument "$x", it is possible to select any arbitrary register 330. In addition, the return instruction register 631 is prepared at the outside of the context register bank 130-C in the example shown in FIG. 6, but the present invention is in no way limited to this fashion. The return instruction address is not designated as the register argument in the instruction, but is given by a fixed register 330. Here it is to be noted that at the time of designating the context register 630 by the RETURN instruction 442, the value of this context register 630 is required to be the same as the value of this context register 630 designated by a corresponding CALL instruction 432. In order to realize this, for example, the RETURN instruction 442 and the CALL instruction 432 use the same register 330 as the context register 630, so that the sequentially started thread guarantees that the value is the same. The register used for this purpose can be exemplified by the register 330 storing a stack pointer.

Next, an operation in which the FORK instruction 418, the STOP instruction 428, the CALL instruction 438 and the RETURN instruction 448 are used in place of the FORK instruction 412, the STOP instruction 422, the CALL instruction 432 and the RETURN instruction 442, will be described briefly. When the FORK instruction 418 and the STOP instruction 428 are used, the link register 530 cannot be designated by the register argument. Therefore, a ceaselessly fixed register 330 is used as the link register 530. The other operation is the same as that when the FORK instruction 412 and the STOP instruction 422 are used. When the CALL instruction 438 and the RETURN instruction 448 are used, the context register 630 cannot be designated by the register argument. Therefore, a ceaselessly fixed register 330 is used as the context register 630. The other operation is the same as that when the CALL instruction 432 and the RETURN instruction 442 are used.

Figure 7:
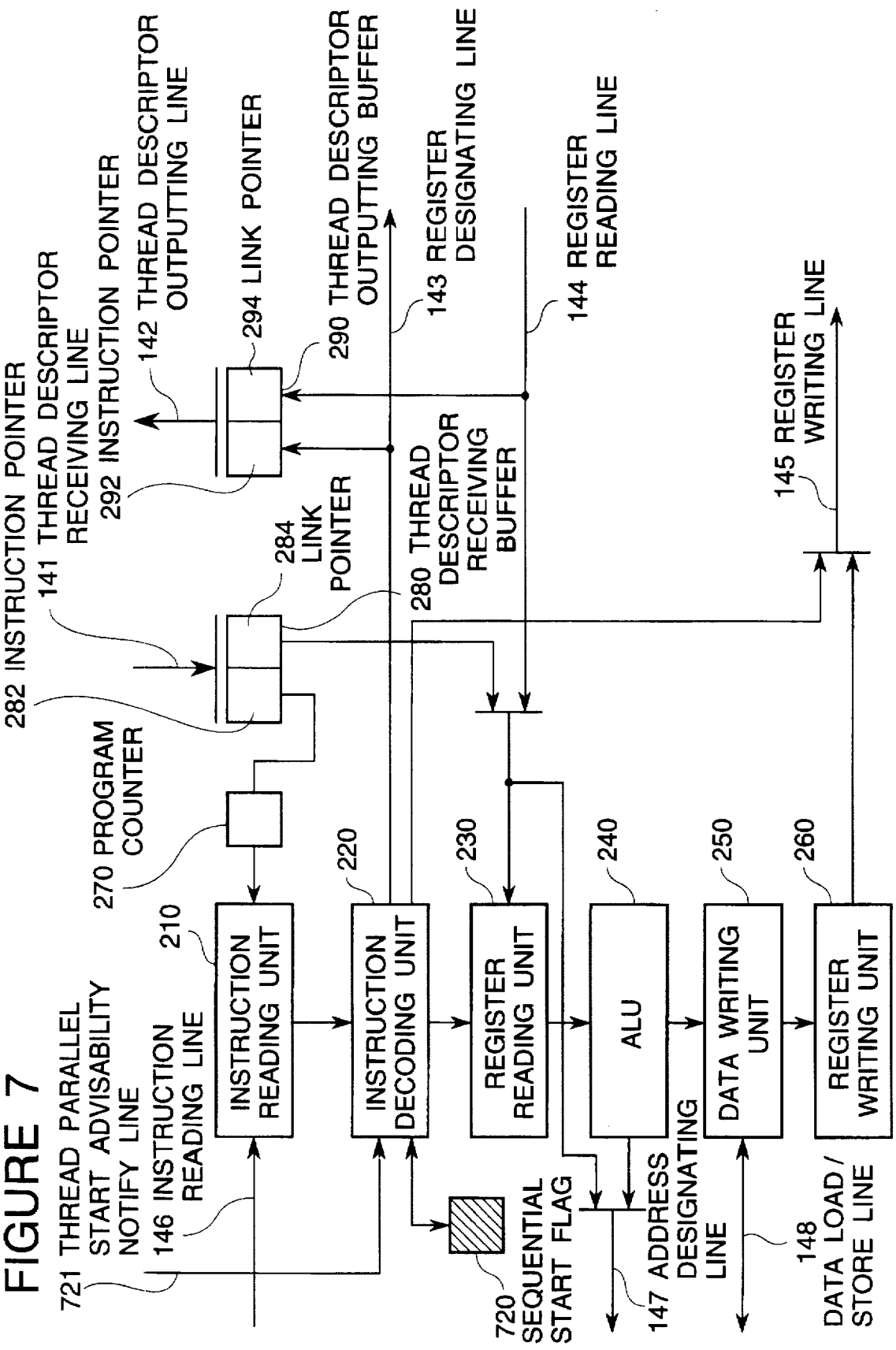
FIG. 7 is a block diagram of another embodiment of the instruction pipelined unit in the multithreaded processor in accordance with the present invention.

Referring to FIG. 7, there is shown a block diagram of another embodiment of the instruction pipelined unit 140 in the multithreaded processor in accordance with the present invention. In FIG. 7, elements similar to those shown in FIG. 2 are given the same Reference Numerals, and explanation thereof will omitted for simplification of the description.

As seen from comparison between FIGS. 2 and 7, the second embodiment includes a sequential start flag 720 in addition to the construction shown in FIG. 2. This sequential start flag 720 is bidirectionally coupled to the instruction decoding unit 220. Furthermore, the instruction decoding unit 220 is connected through a thread parallel start advisability notify line (fork advisability notify line) 721 to an external source.

Figure 8:
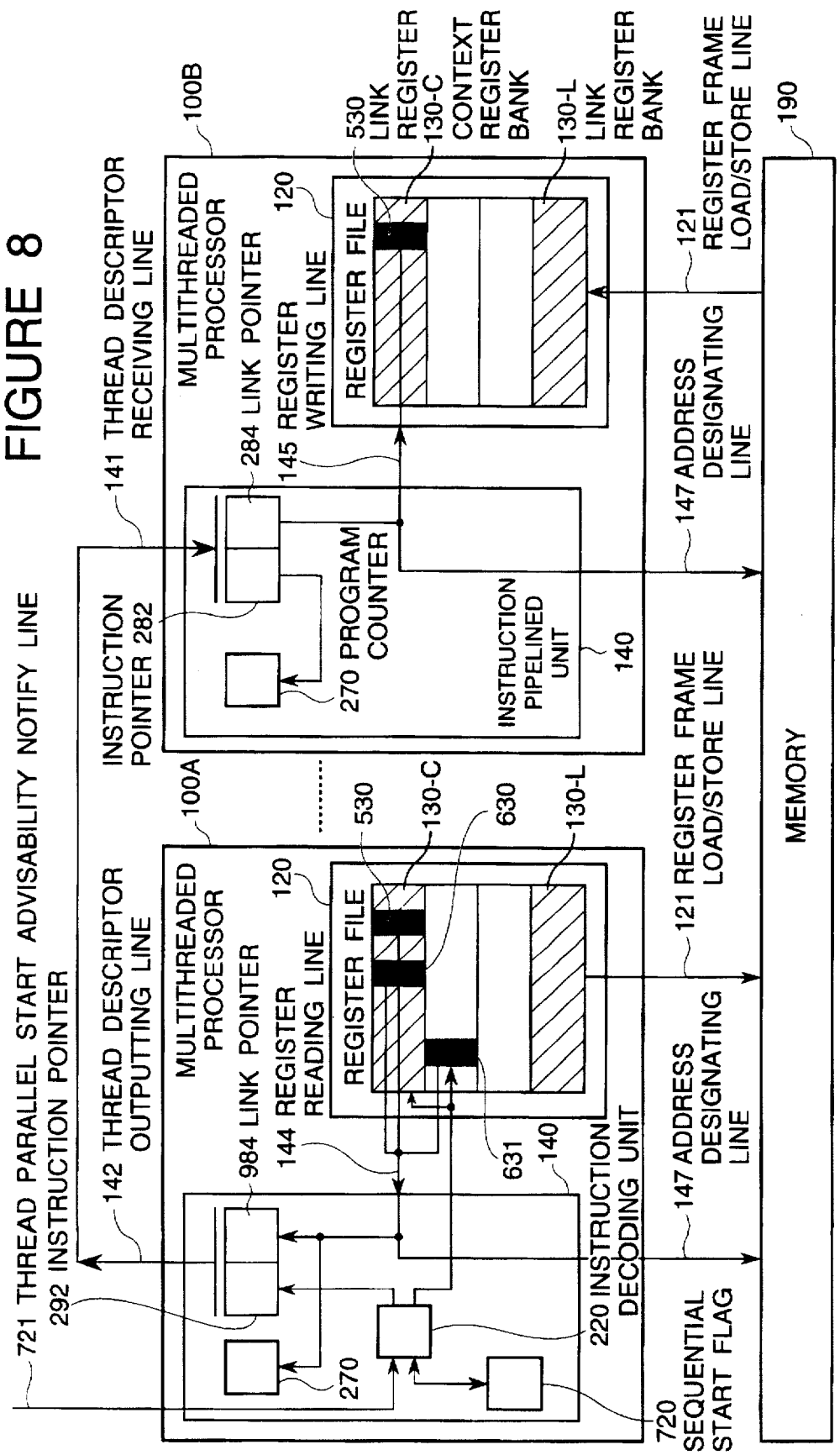
FIG. 8 illustrates an operation of the thread parallel start instruction and the thread end instruction in the multithreaded processor shown in FIG. 7.

Referring to FIG. 8, there is illustrated an operation of the FORK instruction (thread parallel start instruction) 412 or 418 and the STOP instruction (thread stop instruction) 422 or 428 when the instruction pipelined unit 140 shown in FIG. 7 is used in the multithreaded processor shown in FIG. 1. In an example shown in FIG. 8, a left side multithreaded processor 100A schematically operates with the FORK instruction 412 or 418 and the STOP instruction 422 or 428 in the thread started sequentially, and a right side multithreaded processor 100B schematically operates with the STOP instruction 422 in the thread started in parallel. The following description will be made with reference to FIGS. 1 to 4 and 7 and 8.

The FORK instruction 412 is read by the instruction reading unit 210 and then decoded by the instruction decoding unit 220, so that a thread descriptor is outputted. At this time, whether or not it is possible to output the thread descriptor, is discriminated. The result of this discrimination is notified from an external source to the multithreaded processor 100 through the thread parallel start advisability notify line 721. If it is possible to output the thread descriptor, an operation is similar to the operation of the FORK instruction 412 or 418 already explained with reference to FIG. 5. On the other hand, if it is not possible to output the thread descriptor, the sequential start flag 720 is hoisted or activated by the instruction decoding unit 220, and thereafter, an operation similar to the operation of the CALL instruction 432 or 438 already explained with reference to FIG. 6, is carried out. Here, in each of the two embodiments of the thread parallel start instruction 410 and the thread sequential start instruction 430, since the method for designating the argument in the instruction format is the same the same operation is possible as mentioned above.

When the STOP instruction 422 is read by the instruction reading unit 210 and then is decoded by the instruction decoding unit 220, the thread being executed is stopped. At this time, the sequential start flag 720 is referred to by the instruction decoding unit 220. If the sequential start flag 720 is not hoisted or deactivated, an operation similar to the operation of the STOP instruction 422 or 428 already explained with reference to FIG. 5, is carded out. On the other hand, if the sequential start flag 720 is hoisted or activated, an operation similar to the operation of the RETURN instruction 442 or 448 already explained with reference to FIG. 6, is carried out.

Here, it is to be noted that when a thread descriptor cannot be generated in the FORK instruction 412 or 418, it is necessary to save the sequential start flag 720 into the memory 190. This would be a matter of course, because the information indicating whether the thread being executed is the sequentially started thread or the parallel-started thread, is required to be held as the context information. The above mentioned saving operation is realized in the shown embodiment, by transferring the sequential start flag 720 to the register file through the instruction decoding unit 220 and the register writing lines 145 and by saving the transferred sequential start flag 720 when the register frame stored in the context register bank 130-C is saved into the memory 190 through the register frame load/store lines 121. Similarly, when the sequential start flag 720 is in a hoisted or activated condition in the STOP instruction, when the register frame is restored in the context register bank 130-C, the sequential start flag value of a corresponding thread is restored in the sequential start flag 720 from the restored register frame. Thus, the saved value of the sequential start flag 720 is restored in this embodiment.

As seen from the above description, the multithreaded processor in accordance with the present invention has the following advantages.

(1) It is possible to transfer the argument at the time of the thread parallel start, by only the thread parallel start instruction and the thread end instruction. Therefore, the load/store of the argument to the memory is no longer required to be clearly indicated in the code of the thread.

(2) The saving and the restoring of the context information in the register file at the thread sequential start can be performed by only the thread sequential start instruction and the thread return instruction. Accordingly, the load/store of the context information to the memory is no longer required to be clearly indicated in the code of the thread.

(3) When the thread parallel start is dynamically controlled, whether or not it is possible to output the thread descriptor on the basis of the thread parallel start instruction is firstly discriminated. If possible, the argument is saved, and if not possible, the context information is saved. Therefore, even if the thread is dynamically started sequentially, it is possible to efficiently transfer the argument by the register transfer.

(4) When the thread parallel start is dynamically controlled, whether or not the thread concerned is started in parallel or sequentially on the basis of the thread end instruction is firstly discriminated. If the thread concerned is started in parallel, execution of the next thread is started, and if the thread concerned is started sequentially, the context information is restored. Therefore, even if the thread is dynamically started in parallel, it is possible to constitute the thread by completely the same train of instructions.

(5) It is possible to quickly transfer the argument at the time of the thread parallel start, by transferring the register frames stored in the link register bank, in bundle, in units of frame, through the register frame load/store function.

(6) It is possible to quickly perform the saving and the restoring of the context information stored in the register file at the time of the thread sequential start, by transferring the register frames stored in the context register bank, in bundle, in units of frame, through the register frame load/store function.

Thus, the multithreaded processor in accordance with the present invention can reduce the overhead in time attributable to the parallel start and the sequential start of the thread, so that the multithread can be efficiently executed.

The invention has thus been shown and described with reference to the specific embodiments. However, it should be noted that the present invention is in no way limited to the details of the illustrated structures but changes and modifications may be made within the scope of the appended claims.

I claim:

1. A multithreaded processor including an instruction pipelined unit and a register file having of a plurality of register banks, a content stored in each of said register banks corresponding to a register frame, the multithreaded processor being configured to process a plurality of instructions including a thread parallel start instruction, a thread end instruction, a thread sequential start instruction and a thread return instruction, the multithreaded processor being capable of sequentially executing a plurality of threads generated from one program, the multithreaded processor further comprising:

means for saving a register frame from said register file to a memory, the memory being coupled to the multithreaded processor, in accordance with and at a time of executing one of a thread parallel start instruction and a thread sequential start instruction corresponding to one of said plurality of threads; and means for restoring the register frame from said memory to said register file in accordance with and at a time of executing one of a thread end instruction and a thread return instruction corresponding to said one of said plurality of threads, wherein said plurality of register banks includes a link register bank, and a link pointer is defined as a pointer indicating a memory location where a corresponding register frame stored in said link register bank is to be stored into said memory, and further including means for writing, when the multithreaded processor outputs a thread descriptor to another multithreaded processor in order to execute said thread parallel start instruction, said link pointer in said thread descriptor, and wherein said means for saving saves the corresponding register frame stored in said link register bank to the memory location of said memory designated by said link pointer.

2. A multithreaded processor as claimed in claim 1, wherein said means for restoring, when said thread end instruction is executed and the multithreaded processor receives a new thread descriptor to start a new thread in parallel, restores said corresponding register frame from the memory location of said memory designated by the link pointer included in said thread descriptor, to said link register bank.

3. A multithreaded processor as claimed in claim 1, further including register frame load/store means for performing, in a bundle, the saving, the restoring, and the reading of register frames between said register banks and said memory.

4. A multithreaded processor including an instruction pipelined unit and a register file having a plurality of register banks, a content stored in each of said register banks corresponding to a register frame, the multithreaded processor being configured to process a plurality of instructions including a thread parallel start instruction, a thread end instruction, a thread sequential start instruction and a thread return instruction, the multithreaded processor being capable of sequentially executing a plurality of threads generated from one program, the multithreaded processor further comprising:

means for saving a register frame from said register file to a memory, the memory being coupled to the multithreaded processor, in accordance with and at a time of executing one of a thread parallel start instruction and a thread sequential start instruction corresponding to one of said plurality of threads; and means for restoring the register frame from said memory to said register file in accordance with and at a time of executing one of a thread end instruction and a thread return instruction corresponding to said one of said plurality of threads, wherein said plurality of register banks includes a context register bank, and a context pointer is defined as a pointer indicating a memory location where a corresponding register frame stored in said context register bank is to be stored into said memory, and wherein said means for saving, when the processing of a thread being executed is interrupted and a new thread is sequentially started in response to said thread sequential start instruction, saves the corresponding register frame stored said context register bank, to the memory location of said memory designated by said context pointer.

5. A multithreaded processor as claimed in claim 4, wherein said means for restoring, when said thread return instruction is executed and execution of the thread which was executed before the thread was sequentially started, is restarted, restores the corresponding register frame stored in the memory location of said memory designated by said context pointer, to said context register bank.

6. A multithreaded processor as claimed in claim 4, further including register frame load/store means for performing, in a bundle, the saving, the restoring, and the reading of register frames between said register banks and said memory.

7. A multithreaded processor including an instruction pipelined unit and a register file having a plurality of register banks, a content stored in each of said register banks corresponding to a register frame, the multithreaded processor being configured to process a plurality of instructions including a thread parallel start instruction, a thread end instruction, a thread sequential start instruction and a thread return instruction, the multithreaded processor being capable of sequentially executing a plurality of threads generated from one program, the multithreaded processor further comprising:

means for saving a register frame from said register file to a memory, the memory being coupled to the multithreaded processor, in accordance with and at a time of executing one of a thread parallel start instruction and a thread sequential start instruction corresponding to one of said plurality of threads; and means for restoring the register frame from said memory to said register file in accordance with and at a time of executing one of a thread end instruction and a thread return instruction corresponding to said one of said plurality of threads, wherein said plurality of register banks includes a link register bank, and a link pointer is defined as a pointer indicating a memory location where a corresponding register frame stored in said link register bank is to be stored into said memory, and further including means for writing, when the multithreaded processor outputs a thread descriptor to another multithreaded processor in order to execute said thread parallel start instruction, said link pointer in said thread descriptor, and wherein said means for saving saves the corresponding register frame stored in said link register bank to the memory location of said memory designated by said link pointer, said multithreaded processor further including:

means for discriminating, when said thread parallel start instruction is executed and before the multithreaded processor outputs said thread descriptor to said another multithreaded processor, whether or not it is possible to output said thread descriptor;

means for outputting, when said outputting of said thread descriptor is possible, said thread descriptor having the link pointer written therein, said means for saving also saving the corresponding register frame stored in said link register bank to the memory location of said memory designated by said link pointer, by action of a register frame load/store function; and wherein said plurality of register banks includes a context register bank, and a context pointer is defined as a pointer indicating a memory location where a corresponding register frame stored in said context register bank is to be stored into said memory, said means for saving, when said outputting of said thread descriptor is not possible, saving the corresponding register frame stored in said context register bank, to the memory location of said memory designated by said context pointer.

8. A multithreaded processor as claimed in claim 7, further including:

a sequential start flag, wherein when said thread end instruction is executed, at the time of terminating the processing of the thread being executed, said sequential start flag is referred to in order to discriminate whether a new thread is started in parallel or sequentially;

first means for terminating, when the new thread is started in parallel, the processing of said thread being executed, said first means for terminating also receiving a new thread descriptor, corresponding to said new thread, from said another multithreaded processor or from the multithreaded processor, wherein said means for restoring reads out a link register frame from a memory location of said memory designated by a link pointer written in said new thread descriptor, and writing said link register frame in said link register bank; and second means for terminating, when the new thread is started sequentially, the processing of said thread being executed, wherein said means for restoring reads out a context register frame from a memory location of said memory designated by a context pointer, and writing said context register frame in said context register bank.

9. A multithreaded processor as claimed in claim 7, further including register frame load/store means for performing, in a bundle, the saving, the restoring, and the reading of register frames between said register banks and said memory.

\* \* \* \* \*